United States Patent
Vaschillo et al.

(10) Patent No.: US 7,275,087 B2
(45) Date of Patent: Sep. 25, 2007

(54) SYSTEM AND METHOD PROVIDING API INTERFACE BETWEEN XML AND SQL WHILE INTERACTING WITH A MANAGED OBJECT ENVIRONMENT

(75) Inventors: Alexander Vaschillo, Redmond, WA (US); Luca Bolognese, Redmond, WA (US); Todd F. Pfleiger, Redmond, WA (US); Andrew James Conrad, Sammamish, WA (US); Srinivasa Rao Burugapalli, Sammamish, WA (US); Christopher Allen Suver, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1031 days.

(21) Appl. No.: 10/175,118
(22) Filed: Jun. 19, 2002

(65) Prior Publication Data
US 2003/0236859 A1 Dec. 25, 2003

(51) Int. Cl.
*G06F 15/16* (2006.01)
(52) U.S. Cl. .................... 709/218; 709/217; 715/513
(58) Field of Classification Search .............. 709/218, 709/219, 233, 217; 719/316; 715/513
See application file for complete search history.

(56) References Cited

U.S. PATENT DOCUMENTS

| | | | |
|---|---|---|---|
| 5,257,366 A | 10/1993 | Adair et al. | |
| 5,737,592 A | 4/1998 | Nguyen et al. | |
| 6,356,906 B1 | 3/2002 | Lippert et al. | |
| 6,366,934 B1 | 4/2002 | Cheng et al. | |
| 6,813,770 B1 * | 11/2004 | Allavarpu et al. | 719/316 |
| 6,826,726 B2 * | 11/2004 | Hsing et al. | 715/513 |

OTHER PUBLICATIONS

E. Deane; European Search Report, EP 03 00 6813; Berlin, Oct. 5, 2004.

S. Adams; BizTalk Unleashed, Chapter 14: Integrating .NET; Online!, Apr. 4, 2002. http://www.samspublishing.com/dotnet_home/sampler/chapters/0672321769_ch14/0672321769_ch1.html.

Songyan Feng; Automatic Binding of Native C/C++ Libraries to .Net with SWIG; Online! May 30, 2002, pp. 1-10; http://www.people.cs.uchicago.edu/ {songyanf/code/papers/mspaper.htm.

Anon; Microsoft .net Glossary; Online! Jul. 16, 2001, pp. 1-9; http://docs.msdnaa.net/ark/Webfiles/glossary.htm.

Rohit Khare, et al.; "XML: A Door to Automated Web Applications"; Jul.-Aug. 1997; pp. 78-87.

Michael Rys; "Bringing the Internet to Your Database: Using SQL Server 2000 and XML to Build Loosely-Coupled Systems", Proceedings of 17th Int'l. Conf. on Data Engineering (ICDE '01).

Heckyoung Seo, et al.; "Knowledge-based Wrapper Generation bu Using XML"; Samsung Advanced Institute of Technology and Hanyang University, Korea.

Don Box; "House of Com, Is COM Dead?"; House of COM: Is COM Dead—MSDN Magazine, Dec. 2000; pp. 1-9.

Don Box; "House of Com, Migrating Native Code to the .NET CLR"; MSDN Magazine, May 2001; pp. 1-8.

* cited by examiner

*Primary Examiner*—Jason Cardone
*Assistant Examiner*—Adnan Mirza
(74) *Attorney, Agent, or Firm*—Amin, Turocy & Calvin, LLP

(57) ABSTRACT

The present invention relates to a system and methodology to facilitate data communications and data management between network entities operating in accordance with various data structures and operating environments. A managed class of application programming interfaces (API) are provided that support data communications between remote/local locations employing a first data structure and a second location supporting a second data structure (e.g., API for NET languages to access SQL Server via XML views). The managed class and associated APIs provide data transformations between such structures to facilitate communications and data management among various locations and architectures. In addition, the managed class and APIs facilitate operations between disparate object systems such as between managed and unmanaged object systems via interface support of a wrapper and associated marshalling technologies to bridge communications between such systems.

19 Claims, 12 Drawing Sheets

SYSTEM AND METHOD PROVIDING API INTERFACE BETWEEN XML AND SQL WHILE INTERACTING WITH A MANAGED OBJECT ENVIRONMENT

TECHNICAL FIELD

The present invention relates generally to computer systems, and more particularly to a system and method to provide interface classes that transform/transport data structures between a first data structure and a second data structure including processes for bridging between managed and unmanaged object environments.

BACKGROUND OF THE INVENTION

As computer technologies continue to push the bounds of ever increasing performance and innovation, computer system hardware and software requirements have dramatically increased in complexity and sophistication. This has become even more apparent with the growth of network technologies such as the Internet, for example, wherein ever increasing amounts of data are continually being operated upon, requested, transported, and stored. Other applications such as database managers are also being pushed to handle this increasing traffic of data. One technology that has emerged to transport and process data is XML, which is often referred to as a meta-markup language for text documents. Data can be described in XML documents as strings of text, wherein the actual data is encapsulated by text markup that describes the data. A unit of data and associated markup is defined as an element. Currently, XML defines how elements are delimited by tags, what a tag looks like, what names are acceptable for elements, and where attributes are placed, among other specifications, for example.

The markup in an XML document describes the underlying structure of the document and generally defines which elements are associated with other elements. The markup can also include document semantics. As an example, the markup can indicate that an element is a date, serial number, name or other type of code or designation. As these and other types of elements are transmitted (e.g., XML stream) between systems or databases, changes are often required to be made to existing data due to recently discovered errors in the data or due to the data having changed over time (e.g., person's name or address changing). Since XML merely indicates the most recent state of data, problems can occur as data is transported between databases and/or systems.

In addition to the rise of structured content like XML, relational databases have long been the bulwark of the information infrastructure of countless enterprises. Relational databases provide a primary tool for such enterprises to maintain, access, and analyze data. Such database technologies have evolved over many years and are optimized for accessing and manipulating large information bases. Many businesses, for example, store the majority of their critical information in relational databases. Moreover, many Internet sites manage data employing relational database technology. This approach also makes it possible to develop database search engines for sifting through the large volumes of information that "live" on the Internet. Unlike XML, relational databases are not hierarchically structured but rather are relationally structured to provide efficient management of large amounts of data.

The combination of database technology with self-describing structure of hierarchical languages such as XML opens an interesting perspective for new applications. However, the melding of the kind of tree structures supported by hierarchical languages such as XML with the form of a relational data model presents a number of issues, some of which have already been addressed and solved. One persistent problem that remains, however, relates communications between seemingly inapposite theoretical data constructs. Moreover, in addition to the complexities of communicating between different data structural concepts, new programming models and operating platforms have emerged to support such communications.

As computer science has evolved, object oriented programming has become one of many familiar models designers and programmers utilize to implement functionality within computer systems. The object model generally is defined by a class structure that includes class members providing methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another. A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

As described above, managed objects may be allocated from a managed heap and automatically garbage collected. In order to achieve this, references to managed objects are traced. When a last reference to an object is removed, the garbage collector reclaims the memory occupied by the object mitigating the need to reference count managed objects. Thus, a managed environment essentially handles reference counting internally. Tracing is possible within managed code because the managed environment keeps track of outstanding references that exist on an object. As each new object reference is declared within managed code, the managed environment adds the reference to a list of live references. At any given time, the managed environment, rather than the object itself, is thus aware of live references that exist on a given object. As references fall out of scope or change value, the list of live references is updated, and as long as a reference remains within managed code, the managed environment is able to trace it.

Along with object lifetime management issues described above, managed and unmanaged object systems generally differ in many other significant ways. These differences may include how the object systems provide object interfaces within the respective object systems, how data is structured and/or defined, and how errors and exceptions are handled, for example. Due to these and other differences between managed and unmanaged object systems and the data transformation issues described above, it is presently difficult, time consuming, and expensive in terms of development costs to have objects from an unmanaged system interface and interact with objects from a managed system and visa versa. Moreover, it is generally difficult for managed objects designed according to one object system framework to communicate with objects from an architecturally different managed system framework. This also applies to unmanaged object communications between diverse unmanaged system frameworks.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate data communications and data management between network entities operating in accordance with various data structures and operating environments. A managed class of application programming interfaces (API) are provided that support data communications between remote/local sites employing a first data structure such as XML, for example, and a second location supporting a second data structure such as SQL, for example. In one aspect, the managed class and associated APIs enable data transformations between such structures to facilitate communications and data management among various locations and architectures. In addition, the managed class and APIs facilitate operations between disparate object systems such as between managed and unmanaged object systems via interface support of a wrapper and associated marshalling technologies to bridge communications between such systems. The managed class can operate as an interoperability layer on top of an SQLXML data base provider, for example, and expose native or unmanaged interfaces to a managed and/or unmanaged operating environment.

According to one aspect of the present invention, a command class is defined to provide an API that enables queries for data to be directed to an SQL database from remote locations that interact with an XML language. An adapter class can be provided supporting updates or changes to the database as directed from the remote location, wherein a diffgram can be provided that describes desired changes or updates to the database. In addition, a parameter class can be defined for controlling operations within the command and adaptor classes in addition to supporting operations of a bulkload class for moving large amounts of data between entities. The APIs define an interface framework that facilitate communications and operations between systems employing an unmanaged interface technology with systems supporting managed technology, wherein the interface can act as a wrapper to marshal communications between such technologies.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to provide a managed class of APIs to interface with a database system utilizing one type of data structure with a remote/local system employing second type of data structure. In one example aspect, the system may receive remote and/or local XML data in various formats and store the data in SQL format in an SQL database. In addition, XML data may be transformed via the system and associated APIs to target various browsers, handheld PCs, data stores, and/or other remote devices. For these aspects, an interface language such as those implemented in SQLXML enables users to send XML data to and retrieve it from the SQL database. This capability mitigates developers having to author and maintain code needed to transform XML (or other type structure) into another format for consumption by the database. The Managed Classes also facilitate authoring managed code that take advantage of a plurality XML features provided by SQLXML. For example, developers can write managed Visual C#™ or Visual Basic® code (or other language) that utilizes FOR XML, XML templates, annotated schemas, and DiffGrams, for example, when interacting with the database.

Figure 1:
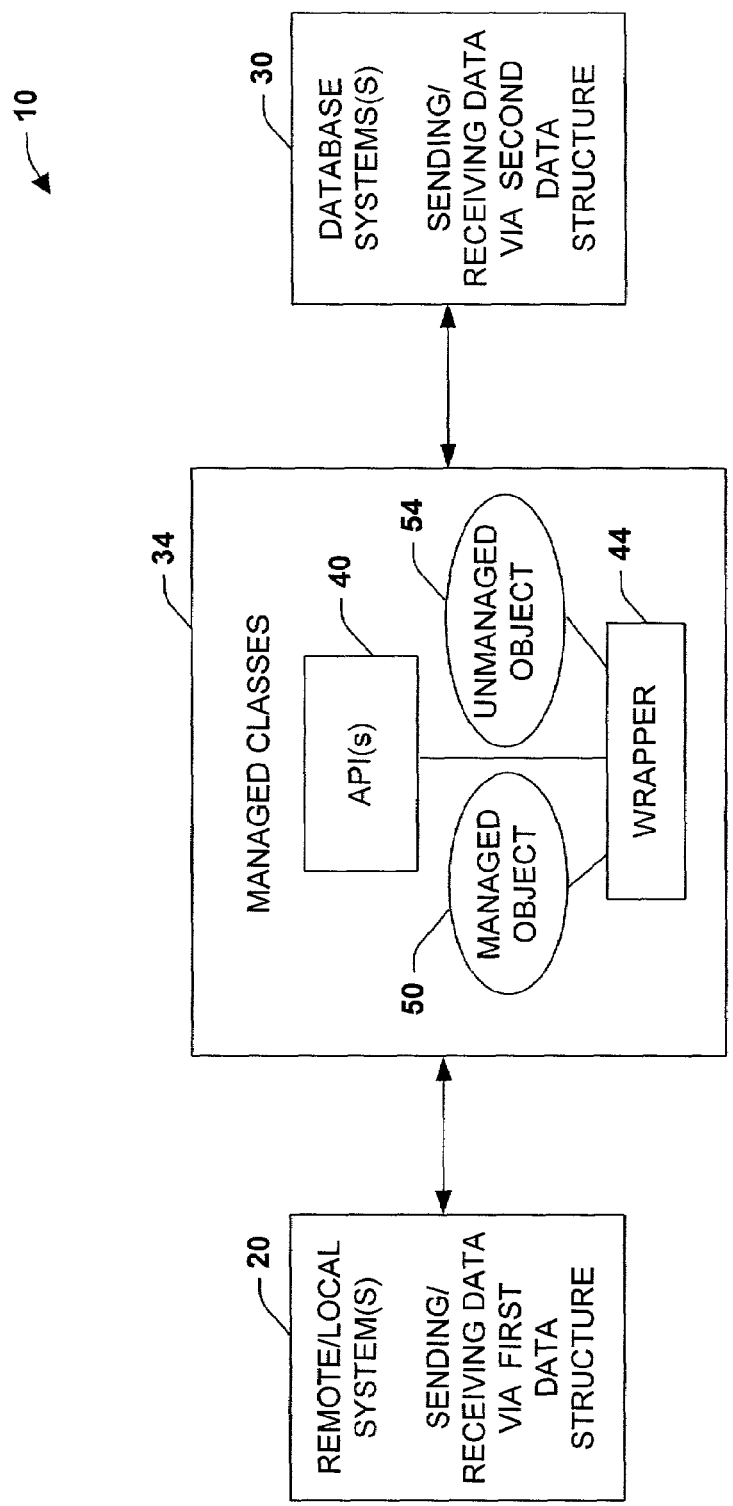
FIG. 1 is a schematic block diagram illustrating a managed class and API architecture in a distributed computing environment in accordance with an aspect of the present invention.

Referring initially to FIG. 1, a system 10 illustrates a managed class architecture in a distributed computing environment in accordance with an aspect of the present invention. One or more remote and/or local computing systems 20 employing a first data structure send and receive data to and from a database system or server 30 employing a second data structure. In one example aspect of the present invention, the remote system 20 communicates via an XML format, and the database system 30 communicates via a data structure such as SQL format. It is to be appreciated however, that the present invention can be adapted with other types of data structures (e.g. binary to ascii, SQL to hex, XML to HTML, WML to SQL and so forth). A managed class 34 and associated APIs 40 are provided to facilitate data transformations and communications between the first and second data structures.

In one aspect, the remote system 20 queries for data from the database 30 in a format supported by the first data structure, the query being transformed by the managed class 34 and sent to the database in accordance with the second data structure. The database system 30 responds to the query in a format supported by the second data structure, wherein the managed class 34 transforms the response from the second data structure to the first data structure before sending query response data to the remote system 20. In another aspect of the present invention, the remote system 20 transmits updates or changes of data in the first format, wherein the managed class 34 transforms the requested changes into the second data format before sending the changes and/or updates to the database 30. As will be described in more detail below, a diffgram and/or bulkload class can be provided to specify desired updates and/or changes directed from the remote system 20.

The APIs 40 provide an interface(s) to facilitate interactions between the remote system or systems 20 and the database system or systems 30. As will be described in more detail below, the APIs 40 support several interface types such as a command type to facilitate retrieving data from the database 30, an adaptor type to facilitate sending changes or updates to the database, a bulkload type to facilitate major/large updates to the database, and a parameter type to control or specify options within the respective interface types. In addition, the APIs 40 can be adapted as a wrapper function at 44. The wrapper 44 receives calls/requests that are coded in accordance with a managed object 50 (or object platform) and provides interface support to facilitate communications with an unmanaged object at 54 (or visa versa). The wrapper 44 and associated marshalling processes, which are described in more detail below, bridge communications between the unmanaged and managed object types at 50 and 54, respectively. The managed class 34 can operate as an interoperability layer on top of an SQLXML (or other type transform) data base provider, for example, and expose native or unmanaged interfaces to a managed and/or unmanaged protocol.

Figure 2:
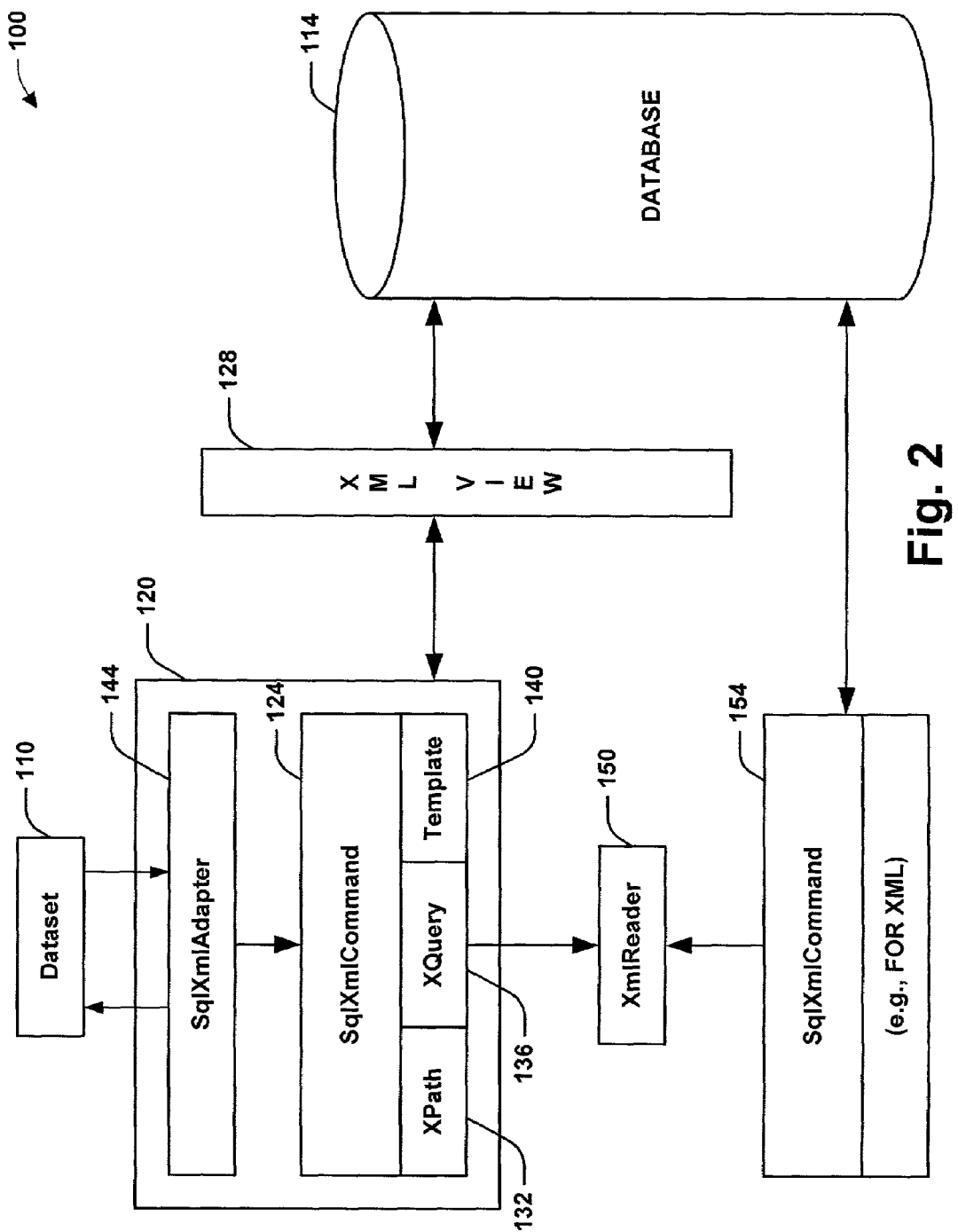
FIG. 2 is a schematic block diagram illustrating an exemplary managed class environment in accordance with an aspect of the present invention.

Before proceeding to a description of the managed APIs and classes of the present invention, FIG. 2 illustrates a system 100 depicting one or more architectural aspects in accordance with the present invention. A remote data set 110 sends XML data to and receives data from an SQL database (or server) 114, wherein a managed class 120 operates in accordance with a system (e.g., network computer) to facilitate transformations between data structures and interactions between operating platforms. Generally, three primary classes are employed to access XML functionality of the SQL Server 114. These are:

SqlXmlCommand at 124 is employed to send a Transact-SQL statement to the database 114, execute a stored procedure, or query the database via other technologies such as annotated schemas/other XML views at 128 and retrieve results as XML.

SqlXmlParameter (illustrated below) specifies a value for a parameter in the command class and/or other class. This can be a parameter to control another class, an ad hoc query, stored procedure, XPath query at 132, Xquery at 136, and/or XML template at 140.

SqlXmlAdapter at 144 is employed to populate a DataSet object with an XML result set, or update the database 114 in accordance with an XML DiffGram which is described in more detail below.

The SqlXmlCommand class 124 is employed when retrieving data from the SQL Server 114 in XML format. This class 124 enables users/systems to send queries to the database and retrieve the results as a stream or XmlReader object at 150, and/or to send the output into another stream. The query can be parameterized, and via the SqlXmlParameter class, users/systems can specify values for the parameters. Remote systems can execute queries via ad hoc Transact-SQL statements, stored procedures, annotated schemas, Xpath 132, Xquery 136 and templates 140. XML data can be returned from the database or server 114, or alternatively a conversion to XML on the client side can be performed by setting a property in the managed class 120. In addition, the SqlXmlCommand can automatically apply a style sheet to an XML result set, performing a transformation between data structures.

Other operations performed by the command class 124 include retrieving XML data via an ExecuteStream method which returns XML data from SQL Server 114 as a managed code stream instance. One reason for returning results as a stream may be to perform an operation on a document as a whole without substantial regard for its contents. Such an operation could include compressing or encrypting the result set. In this case, the XML results are generally not treated as an actual XML document, but rather as a stream of bytes. In another instance, rather than return XML data from SQL Server 114 as a Stream object, an XML result can be sent directly to the destination 110 without modification. In this case, an ExecuteToStream method sends resulting XML to a FileStream object, a NetworkStream object, and/or a Response object.

An ExecuteXmlReader method, which returns an XmlReader object at 150 is a high-performance object that can iterate through one or more nodes in an XML result set. If random access is needed to the XML results, XmlReader can be passed as an argument to a constructor of an XmlDocument object (not shown). The XmlDocument object can be employed with a Document Object Model (DOM), for example, for manipulating the result set.

In some cases, existing stored procedures may not be edited to return an XML result set. For example, consider the following stored procedure:

Generating XML on the client side generally involves the following acts:

Setting a ClientSideXml property of the SqlXmlCommand object to true at 124.

A CommandText property updated to contain "FOR XML NESTED" or "FOR XML RAW" or "FOR XML Explicit". This clause is intercepted by an OLE DB (or other type) provider at reference numeral 154, and indicates that the result set should be converted to XML. Though the stored procedure may not have not been modified, an XmlReader object can be instantiated on the client or remote system.

If ad hoc queries or stored procedures are employed to query the SQL Server 114, columns in the result set can be serialized as attributed in a resulting XML document. There is also an element-centric mode for returning XML via NESTED, AUTO or RAW XML modes. If the format of returned XML should be changed, an annotated schema can be employed to define which columns will be expressed as elements, and which columns will be expressed as attributes. Annotated schemas enable modifying the result set via Xpath at 132. An annotated schema is an XML schema document that specifies tables and columns to query in SQL, and the structure of a resulting XML format. A SchemaPath property specifies a physical path to a schema file. This path can be relative to the location of the executable. The schema file maps resulting XML to tables and columns in the database. A CommandText property specifies an XPath query 132 that defines an XML result set, wherein XPath syntax at 132 searches for matching elements and can limit a resultant set of data. XPath 132 can be employed in conjunction with XSL Transformations (XSLT) to select specified nodes from an input XML document for transformation or rendering. XPath can also be utilized with DOM to select a subset of nodes to work with programmatically.

The SqlXmlAdapter class or object 144 can be employed to update the database 114 with an XML DiffGram which is described in more detail below. As an example, this can be employed when XML data has been generated with an annotated schema, the user/system has modified the data, and there is a desire to store the changes back in the database 114. DiffGrams support insert, update, and/or delete operations, for example, wherein the SqlXmlAdapter class 144 can include methods, which are described in the following table.

| Method | Description |
| --- | --- |
| Fill(DataSet ds) | Populates a DataSet object with XML data retrieved from SQL Server. |
| Update(DataSet ds) | Updates SQL Server to reflect changes to the DataSet object using an XML DiffGram. |

The following Figures and discussion illustrate exemplary interfaces and APIs for interacting with the managed classes and operating environments described above. As noted above, the interfaces can be adapted for operations with a plurality of various data structures and/or managed and unmanaged object systems. Interface aspects can include SQLXML functionality as described above providing several interfaces that expose various features. Some of these interfaces can include:

HTTP Interface (e.g., URL Queries and Templates)
SQLXML OLE DB Provider (e.g., ADO)
SQLXML Managed Classes
SOAP (e.g., Simple Object Access Protocol or other network protocol)

The respective interfaces expose similar SQLXML functionality, but in different ways, wherein users/systems can select the interface that fits a desired usage scenario. The SQLXML Managed Classes enable developers to write applications for a managed platform (e.g., NET platform) and interact with applications developed within an unmanaged environment (e.g., OLE, ActiveX, COM running on standard operating system). For example, the SQLXML Managed Classes can be provided as an interoperability layer on top of an SQLXML OLE DB provider (or other type provider), wherein the classes expose native or unmanaged OLE DB features in the managed environment. In essence the Managed Classes and APIs operate as a wrapper marshalling managed calls to native or unmanaged OLE DB.

Figure 3:
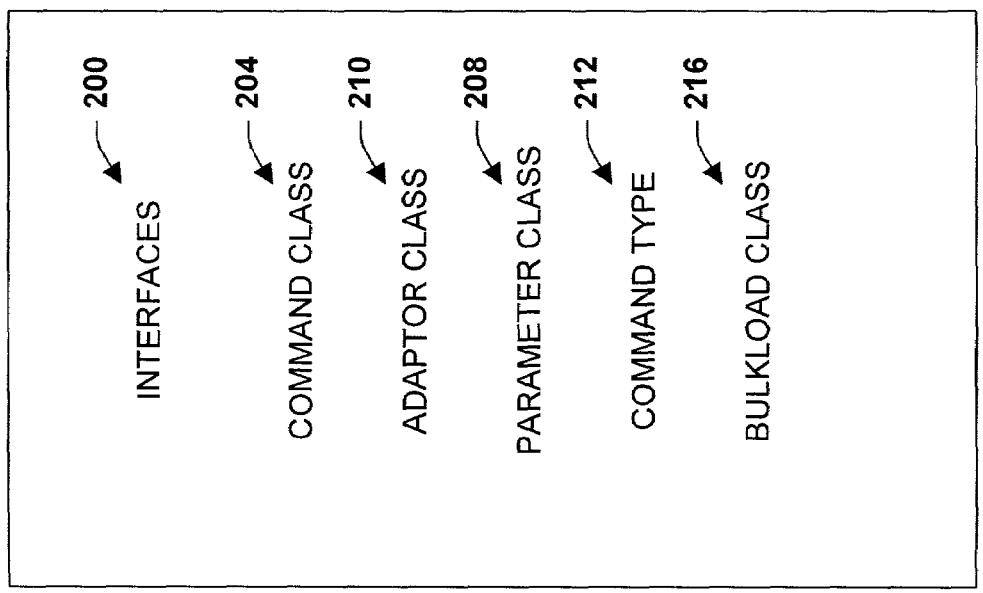
FIG. 3 is a diagram illustrating interfaces in accordance with an aspect of the present invention.

FIG. 3 illustrates some possible interfaces 200 in accordance with an aspect of the present invention. The interfaces 200 can include a command class at 204, a parameter class at 208, an adaptor class at 210, a command type at 212 and a bulkload class at 216. The following discussion illustrates an example implementation of the respective classes, however, it is to be appreciated that the present invention is not limited thereto.

The command class 204 can be adapted as an interface SqlXmlCommand. It enables users to execute SQLXML requests (e.g., SQL Query, Xpath Query, call a template, and so forth) and obtain an XML result from a database having a different structural format. Since some requests (such as templates) can take a number of parameters, the SqlXmlParameter class 208 is provided to represent respective parameters. The adaptor class 210 can be provided as an SqlXmlAdapter class and introduced to manage Datasets. This class enables users to Fill and Update a Dataset via SQLXML Managed Classes and diffgrams which are described below. Command types 212 include an SqlXmlCommandType that is an enum that lists the possible commands SQLXML Managed Classes support or execute. The bulkload class 216 includes an SqlXmlBulkload to access Bulkload functionality such as loading XML files into relational tables by shredding them according to a mapping schema. It is noted that the respective classes and interfaces can be are defined by a namespace address such as namespace company.Data.SqlXml or other suitable name.

Figure 4:
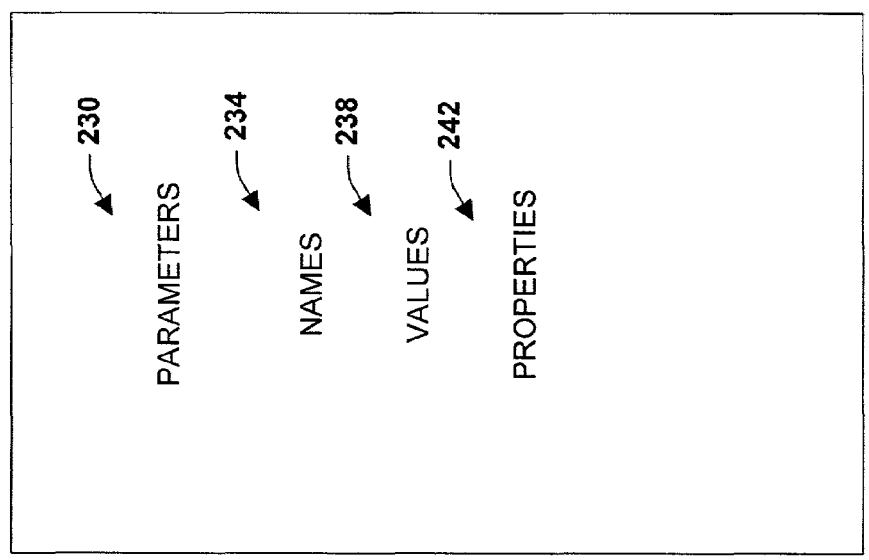
FIG. 4 is a diagram illustrating a parameter class in accordance with an aspect of the present invention.

FIG. 4 illustrates aspects of a parameter class 230 in accordance with an aspect of the present invention. The parameters 230 can specify one or more names 234, values 238, and/or properties 216. For example, the parameter class 230 can define an SqlXmlParameter class to represent parameters passed to SQLXML classes via a command or other type class. These parameters 230 can be passed to a query, template or updategram in a URL query, for example. Parameters 230 can have names 234 and values 238, whereby the SqlXmlParameter class can employ properties 242 such as a get and set property for adjusting class operations. A command may take any number of parameters 230 that can be defined as:

```
public class SqlXmlParameter {
    public string Name {get;set;}
    public Object Value {get;set;}
}
```

Figure 5:
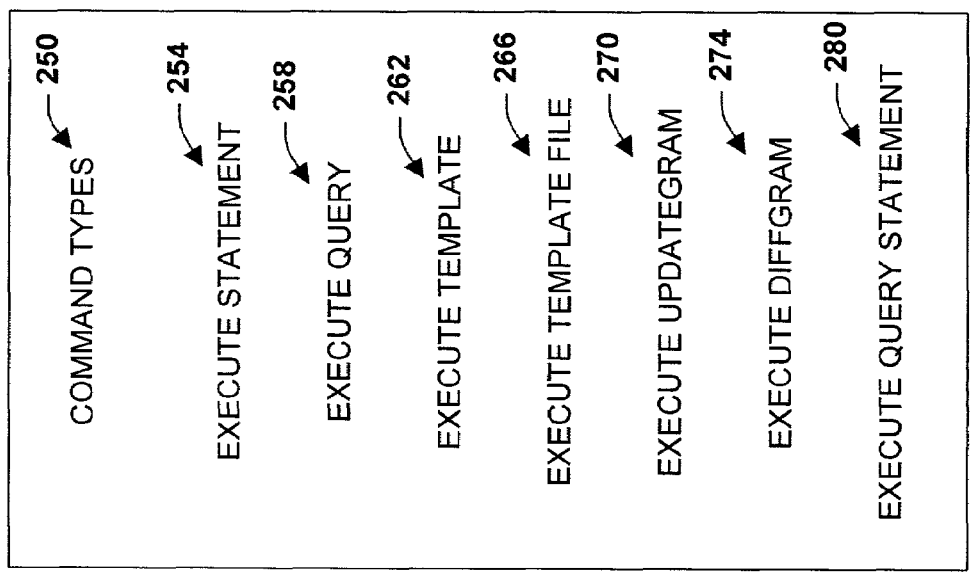
FIG. 5 is a diagram illustrating command types in accordance with an aspect of the present invention.

FIG. 5 illustrates a command types API 250 that enumerates possible supported command class functionality. This enumerated type 250 lists commands supporting SQLXML Managed classes such as the following example below and can list such commands as an execute statement 254, an execute query 258, an execute template 262, an execute template file 266, an execute updategram 270, an execute diffgram 274, and/or an execute query statement at 280. One possible exemplary listing is as follows:

```
{
    SQL = 1         // Execute SQL statement
    XPath,          // Execute Xpath Query
    Template,       // Execute an existing template
    TemplateFile,   // Execute "TemplateFile"
    Updategram,     // Execute an existing Updategram
    Diffgram,       // Execute an existing Diffgram
    XQuery          // Execute XQuery statement
}
```

These values can be employed to select and set a dialect for an underlying native OLE DB request, for example, wherein the listed value at 250 corresponds to a dialect. It is noted, that cardinal values at 250 may not necessarily correspond to cardinal values in a native interface. For example, a mapping layer may exist in between managed and unmanaged layers.

Figure 6:
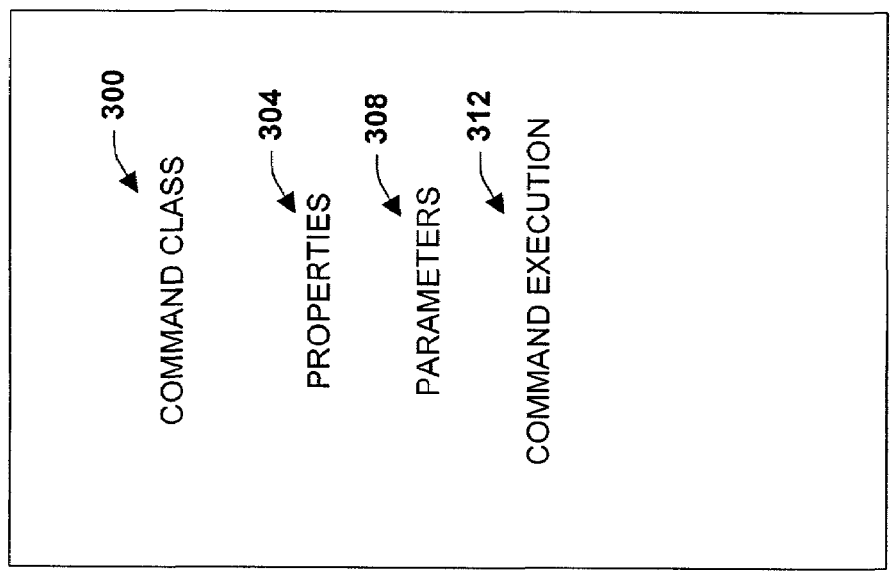
FIG. 6 is a diagram illustrating a command class in accordance with an aspect of the present invention.

FIG. 6 illustrates a command class 300 having associated properties 304, parameters 308, and/or command execution functions at 312 in accordance with an aspect of the present invention. The command class 300 can be provided as an SqlXmlCommand class to represent a command to an SQLXML provider or transformation utility. Users can create an instance of this class to execute a command. The same instance can later be reused to execute other commands, if desired. As an example, a command can be provided as an SQL Query, an XPath Query, a template, and so forth. A list of commands supported is listed in an SqlXmlCommandType as described above.

To execute an SQLXML command, users/systems create an instance of SqlXmlCommand, calling a constructor such as: public SqlXmlCommand (string cnString). The parameter is a connection string employed to connect to a database (e.g., data provider). Some or all of the command properties can then be set along with command parameters to execute the command to obtain a result (e.g., XML query sent to managed class, managed class transforms query to SQL, SQL data is sent in response to query and transformed back to XML).

The following exemplary properties 304 may be set before executing a command 300:

public SqlXmlCommandType CommandType {get{}set{}}—The type of command to be executed. If this property is not set—an SQL statement can be assumed by default.

public string CommandText {get{}set{}}—This is the actual text of a command: SQL Statement, the body of updategram, and so forth. A CommandStream or CommandText property may be required to be set. An exception can be thrown if neither is set. An exception can also be thrown if both are set at the time of execution.

public string CommandStream {get{}set{}}—This is a stream containing the actual command: SQL Statement, the body of updategram, and so forth. A CommandStream or CommandText property may be required to be set. An exception can be thrown if neither is set. An exception can also be thrown if both are set at the time of execution. This property can also be supported on Template, Diffgram and Updategram dialects.

public string Namespaces {get{}set{}}—This property is employed to set up namespaces definition. The namespaces defined here can then be utilized in XPath queries, for example.

public string RootTag {get{}set{}}—The result of the command execution will be wrapped in a tag with a name specified in this property. The tag will become the root tag of the result. This is useful if the result is otherwise an XML fragment and it needs to be converted to XML document. The semantics can be the same as in URL Queries, for example.

public string SchemaPath {get{}set{}}—A path to annotated schema (e.g., XDR or XSD) to be used with XPath queries, Updategrams, Diffgrams, and so forth. The semantics can be the same as in templates.

public string XslPath {get{}set{}}—A path to XSL to be applied to the result of the command execution before returning to the user. The semantics can be the same as in templates and can be relative to a Base Path.

public string BasePath {get{}set{}}—The BasePath to be employed in the command. All or portions of the other paths can be related to the base path.

public string OutputEncoding {get{}set{}}—Defines output encoding on the output stream.

public bool ClientSideXml {get{}set{}}—Informs SQLXML to perform XML processing at mid-tier (e.g., client-side). If this property is TRUE, FORXML functionality can be performed on the mid-tier, and regular SQL Statements (not FORXML) will generally be passed to the database server.

If the command type accepts any parameters (e.g., a template having parameters), users can set the parameters via a public SqlXmlParameter CreateParameter( ) function. This function will create and return a pointer to an instance of SqlXmlParameter class. Users should then set the Name and Value properties of this instance and this parameter will be passed along with the command for execution. A public void ClearParameters( ) function will clear the parameters created in this command so that the SqlXmlCommand object can be reused for the next command. When the properties 304 are set, users/systems can execute the command using one of the following exemplary functions at 312:

public void ExecuteNonQuery()—Executes a command that does not return a stream.

public Stream ExecuteStream()—Executes a command, creates a new stream and returns the result in that stream.

public Void ExecuteToStream(Stream outputStream)—Executes a command and returns the result in a stream specified in an outputStream parameter. Throws an exception if outputStream is not valid or if outputStream is not reset to start.

public XmlReader ExecuteXmlReader()—Executes a command and returns the result as an XmlReader object.

Figure 7:
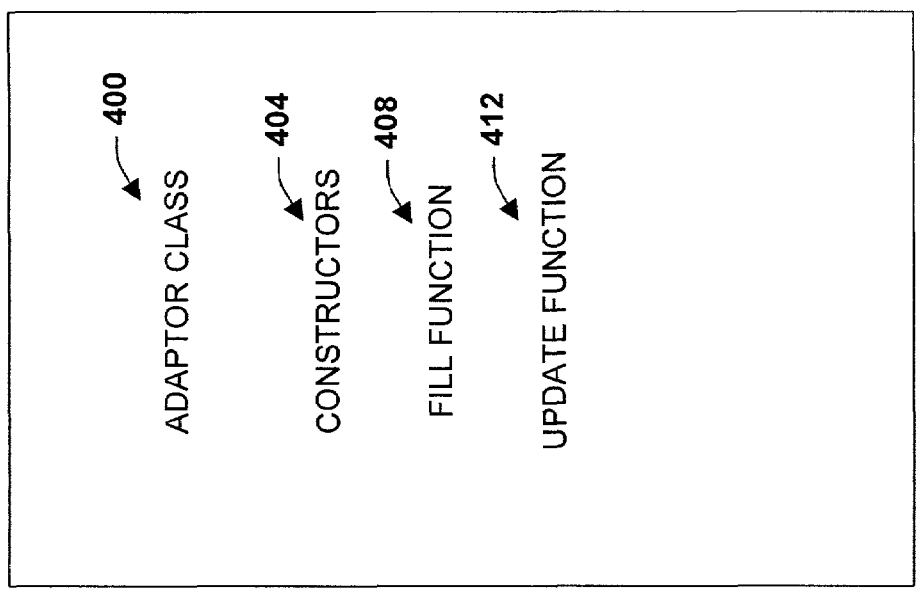
FIG. 7 is a diagram illustrating an adaptor class in accordance with an aspect of the present invention.

FIG. 7 illustrates an adaptor class 400 having associated constructors 404, fill functions 408, and update functions 412 in accordance with an aspect of the present invention. The adaptor class 400 can be adapted as an SqlXmlAdapter class utilizing managed classes with Datasets.

To create an instance of an SqlXmlAdapter one or more of the following exemplary constructors 404 can be employed:

public SqlXmlAdapter(SqlXmlCommand cmd)

public SqlXmlAdapter(string commandText, SqlXmlCommandType cmdType, string connectionString)

public SqlXmlAdapter(Stream commandStream, SqlXmlCommandType cmdType, string connectionstring)

The constructors 404 typically require a command to be passed in one of the following manners:

A public void Fill(DataSet ds) function at 408 can be employed to fill the dataset with SQL Server data through an SQLXML Managed Class using the command specified in the constructor.

A public void Update(DataSet ds) function at 412 can analyze the changes user made in the Datasets and generate and run Diffgrams to update SQL Server data based on the changes to the Dataset. Diffgrams are described in more detail below in relation to FIG. 9.

Figure 8:
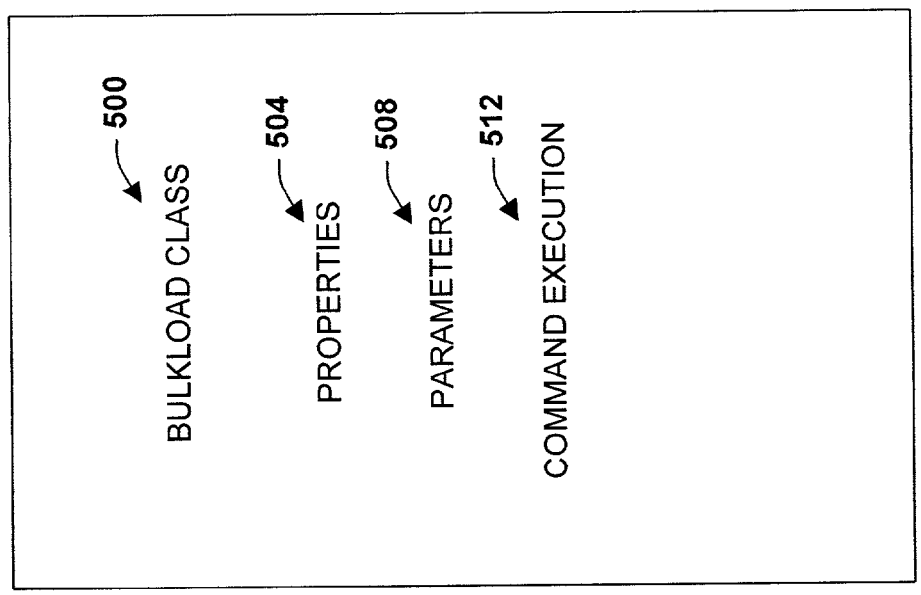
FIG. 8 is a diagram illustrating a bulkload class in accordance with an aspect of the present invention.

FIG. 8 illustrates a bulkload class 500 having associated properties 504, parameters 508, and/or command execution functions at 512 in accordance with an aspect of the present invention. The bulkload class 500 can be provided as SqlXmlBulkload class and act as a managed wrapper for a native implementation of Bulkload functionality enabling data access from managed platforms.

The following illustrates some exemplary bulkload properties 504:

public string ConnectionString {get{}set{}}—Sets the connection string
  public unknown ConnectionCommand {get{}set{}}—Sets the connection command object
  public bool KeepNulls {get{}set{}}—Empty columns keep NULL value
  public bool KeepIdentity {get{}set{}}—Use the identity values specified in the data
  public bool CheckConstraints{get{}set{}}—Check integrity constraints
  public bool ForceTableLock{get{}set{}}—Forces table-level lock during bulk load
  public bool XMLFragment{get{}set{}}—Data is an XML fragment
  public bool Transaction{get{}set{}}—Enable transactional behavior
  public bool IgnoreDuplicateKeys{get{}set{}}—Ignore primary constraint errors
  public bool Bulkload{get{}set{}}—Enable BulkLoad
  public bool SchemaGen{get{}set{}}—Run Schema Generator to create tables before running BulkLoad
  public bool SGDropTables{get{}set{}}—SchemaGen: Drop tables if they exist
  public bool SGUseID{get{}set{}}—Use ID to create primary constraints
  public string ErrorLogFile {get{}set{}}—Error log file
  public string TempPathFile{get{}set{}}—Path where temporary files are created when using transactional mode When the one or more of the properties 504 are set, user/systems can execute the commands at 508 via the following functions:

public void Execute(string bstrSchemaFile, string filename)—Indicates the schema file to use and a file containing the XML data to load
  public void Execute(string bstrSchemaFile, stream xmlData)—Indicates the schema file to use and a stream of XML data to load.

Figure 9:
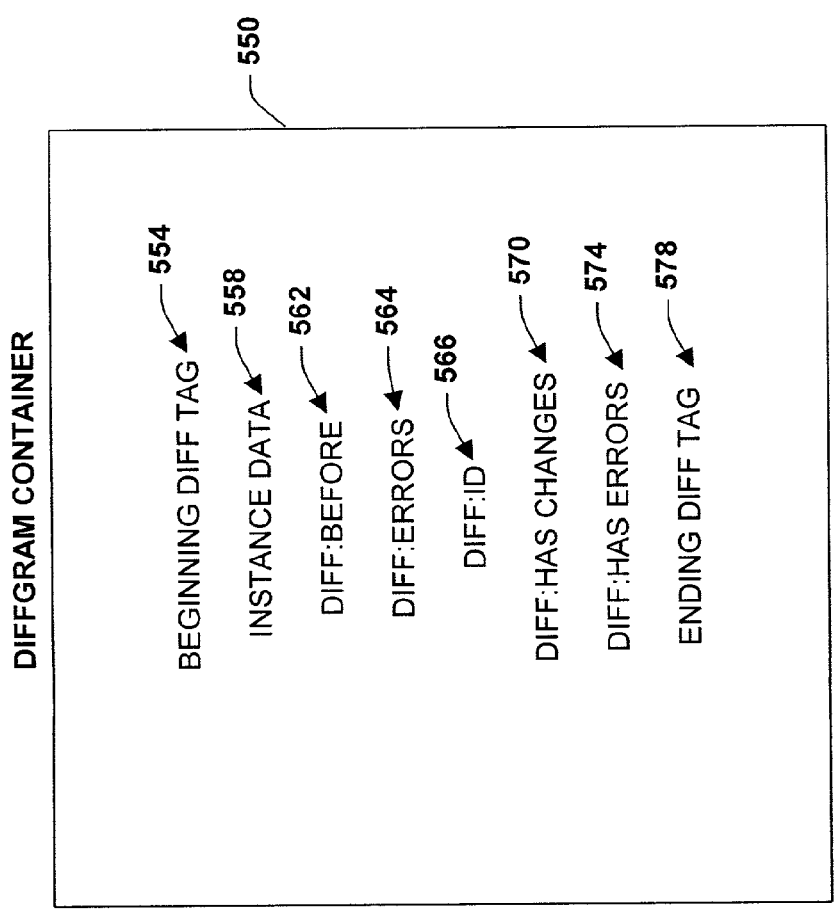
FIG. 9 is a diagram illustrating a diffgram in accordance with an aspect of the present invention.

Referring now to FIG. 9, an XML compatible diffgram is provided in accordance with the present invention. In general, a diffgram is an XML transmittable file or record that includes data/state information from a current data source, data/state information relating to differences associated with a previous data source and indications of errors if desired, associated with the differences in the data sources. A diffgram format is provided that includes a container 550 that defines boundaries for the diffgram and includes within the boundaries a description of the differences from previous XML transmissions or current database information. Thus, the difference information provided by the diffgram enables change-specific portions of a database (e.g., database records having errors, adding/removing data) to be updated without affecting or re-transmitting other associated data. As an example, a database may include a plurality of related records, wherein one or more of the records is to be changed, altered or updated. The diffgram provides a mechanism, wherein the record to be updated or changed is indicated by both current and previous states of the record. In this manner, applications such as a database manager, for example, can efficiently update a database without replicating redundant information, without having to determine what has changed in a new data transmission and also mitigating the time involved with correcting errors associated with previous erroneous database entries.

Turning now to FIG. 9, a container 550 is illustrated in accordance with an aspect of the present invention. The container 550 can include beginning and ending tags 554 and 578, instance data 558, before data 562, an id tag 566, a changes field 570 and an errors field 574. The general format for a diffgram as provided in the container 550 is composed of the following parts:

Diffgram Version Information:

<?xml version="1.0"?>

Following Line Points to Source Data and Includes Beggining Tag 310:

<diffgr:diffgram xmlns:msdata="urn:schemas-companyname-com:xml-msdata"

Following Line Describes Diffgram Format:

xmlns:diffgr-"um:schemas-companyname-com:xml-diffgram-01"

The Following Container Contents are Described Below:

```
<ROOT_ELEMENT>
    <xml_instance_data>
    . . .
    </xml_instance_data>
</ROOT_ELEMENT>
    <diffgr:before>
    . . .
    </diffgr:before>
    <diffgr:errors>
    . . .
    </diffgr:errors>
</diffgr:diffgram>
```

The Following Provides a Description of the Above Diffgram Contents:

diffgr:diffgram (the outer container)

The diffgram tags 554 and 578 represent a container where the data is stored. The structure of the data inside can be:

1. An instance document.
2. A changes part representing the changes to the document in form of before and after data images.

Instance Data 558

This is the data part of the file and represents the current values of the data.

diffgr:before

The changes can be expressed in <before> tags.

For updated rows the row is present and identified by the diffgr:id 566;

For inserted rows no entry need be present;

For deleted rows, the row deleted is present and identified by a diffgr:id 566 not present in the data part;

For the data in the instance part 558 such as for example:

```
<Customer diffgr:id="Customer20" Name="Bob">
    <City>Vienna</City>
</Customer>
This data can be present in the changes part.
<diffgr:before>
    . . .
    <Customer diffgr:id="Customer20" Name="Rob">
        <City>Monaco</City>
    </Customer>
    . . .
</before>
``` diffgr-errors 564

The errors are described in the errors part:

For this data in the instance part, for example:

```
<Customer diffgr:id="Customer20" Name="Bob">
    <City>Vienna</City>
</Customer>
The errors can be described in the following manner:
<diffgr:errors>
. . .
<Customer diffgr:id="Customer20" diffgr:Error="Some errors were present"
Name="Inconsistent name for this person">
    <City>The city is not correct</City>
</Customer>
. . .
</errors>
```

A similar format is utilized in the data part, the before part and the error part.

There can be one before clause and one error clause and the before clause generally appears before the errors clause.

diffgr:id 566

The id tag can be added to the elements:
  It should be unique for substantially all the elements in the stream;
  It is generally required on elements in the before part;
  It is generally required on modified elements in the data part;
  It is optional on unmodified elements in the data part.
  If the id tag 566 is present in the before clause, but there is no equivalent tag in the instance data a processor that has to merge the two parts can be configured to throw an error.

diffgram:hasChanges 570

This attribute is generally present in modified elements in the data instance part.

It can have the following values:
  "inserted" if the element has been inserted;
  "modified" if the element has been modified;

This is useful to have information early in the parsing of a document, for example.

diffgram:hasErrors 574

This tag is generally present in elements that have errors in the data part or in the before part (e.g, deleted elements).

It can have this value:
  true: meaning that the element has errors

Figure 10:
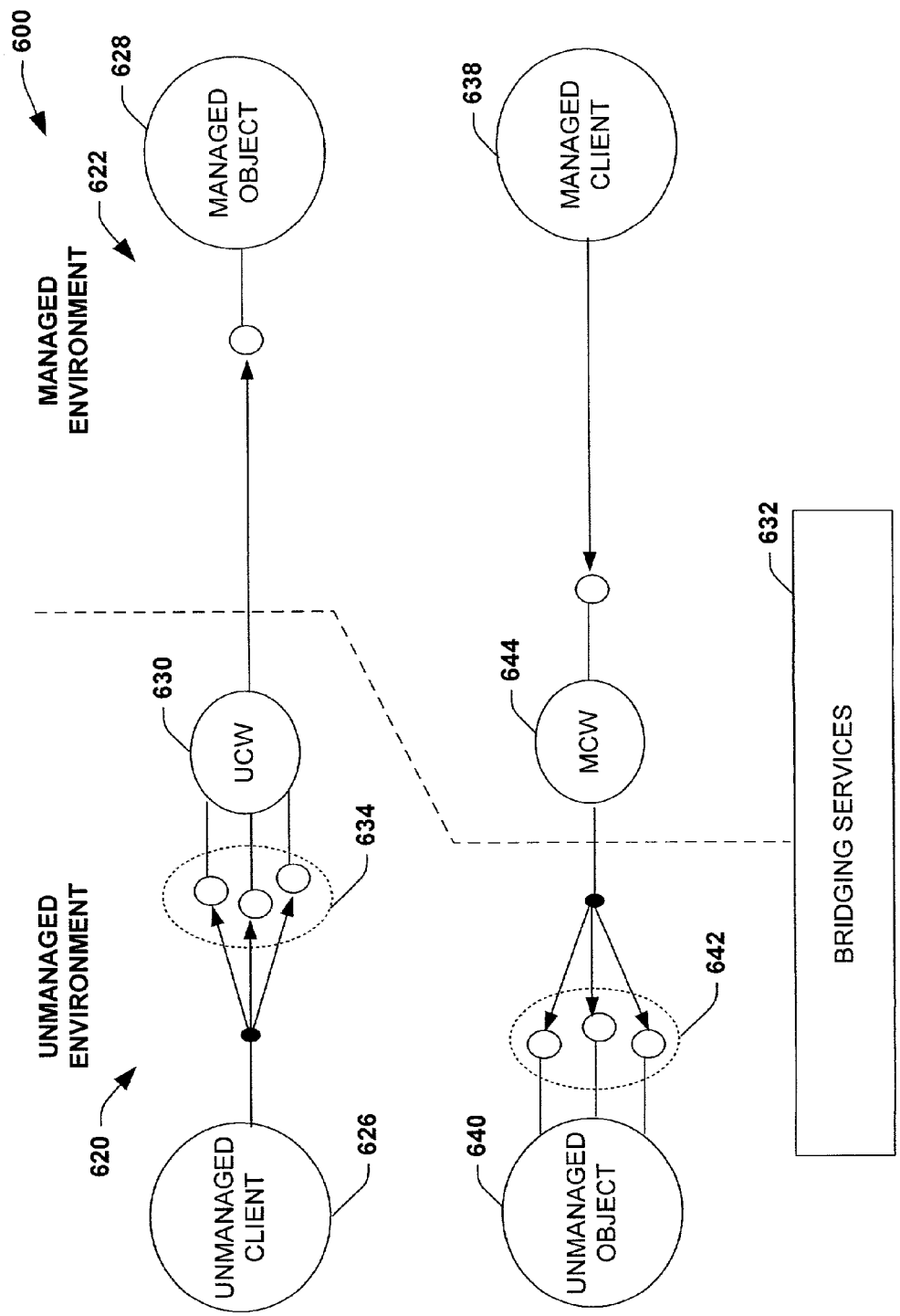
FIG. 10 is a schematic diagram illustrating object bridging in accordance with an aspect of the present invention.

Referring now to FIG. 10, a system 600 illustrates bridging between disparate object systems (e.g., managed/unmanaged) in accordance with an aspect of the present invention. The system 6000 is illustrated in a bifurcated manner, wherein communications and interactions between disparate object systems may occur from an unmanaged environment 620 to a managed environment 622 and visa versa. It is noted that the unmanaged and managed environments 620 and 622 may exist on the same system or may communicate remotely over a network, for example, and may include bridging between dissimilar objects belonging to one or more managed systems and/or dissimilar objects belonging to one or more unmanaged systems. Although the following description generally relates to bridging between managed and unmanaged object systems for exemplary purposes, it is to be appreciated that bridging can occur between other architecturally different object types.

The following description first details utilizing managed objects from the unmanaged environment 620, wherein an unmanaged client 626 accesses services provided by a managed object 628. When the unmanaged client 626 creates an instance of the managed object 628, the managed object 628 is exposed through an Unmanaged Callable Wrapper (UCW) 630 that acts as a proxy for the managed object 628. The UCW 630 is generally not "visible" within the managed environment by other managed classes/objects, however, the UCW 630 is utilized for marshaling calls between managed and unmanaged code. This enables transparent interaction between the unmanaged and managed environments and provides insulation from architectural differences between the environments. Thus, developers in one object system generally do not have to account for implementation details (e.g., design custom interface code) in the other object system. Each managed object referenced outside the managed environment 622 provides a single UCW regardless of the number of references that exist on the managed object 628. This facilitates that a single object identity is shared between the UCW and the unmanaged client 626. It is to be appreciated that although the above discussion details a single unmanaged client and managed object, a plurality of such clients/objects may be employed in accordance with the present invention.

As described above, the UCW 630 may be viewed as a proxy for the managed object 628 being referenced from the unmanaged environment 620. Thus, the UCW 630 is transparent to the managed object 628 that is referenced by the UCW 630 in contrast to a managed client. A UCW reference on the managed object 628 is traced like any other managed reference, wherein the unmanaged client's reference on the UCW 630 is reference counted like any other unmanaged reference. If multiple unmanaged clients (not shown) share a reference to the same managed object 630, a bridging services component 632 is provided to direct the multiple references to the same UCW 630. In other words, there should not exist more than one UCW 630 for any instance of the managed object 628. As will be described in more detail below, the bridging services component 632 provides type information/conversion between the managed and unmanaged environment to enable unmanaged clients to bind/interface to managed objects and managed clients to bind to unmanaged objects.

During an activation process, the managed environment 622 instantiates the managed object 628 as well as the UCW 630. The managed object 628 is allocated from a garbage-collected heap (not shown) while the UCW 630 is allocated from a non-collected heap. This enables the managed environment 622 to move the object 628 in memory as necessary. The UCW 630 holds a single reference to the managed object 628 in order to keep the object 628 active as long as the UCW is active. Since the UCW 630 is allocated in non-collected memory, the managed environment 622 is freed to distribute interface pointers 634 on the UCW 30 to the unmanaged client 626. The UCW 630 is reference counted like other unmanaged objects. When the reference count reaches zero, for example, the UCW 630 discontinues tracing the reference on the managed object 628, wherein the managed object is reclaimed during the next garbage collection.

In accordance with the present invention, a managed client 638 may communicate and interact with an unmanaged object 640. When the managed client 638 creates an instance of the unmanaged object 640, the unmanaged object and associated interfaces 642 are exposed through a managed callable wrapper (MCW) 644 that acts as a proxy for the unmanaged object 640. Managed wrappers appear to be like any other managed class to the managed client 638 but are utilized to marshal calls between managed and unmanaged code. Objects being referenced outside the managed environment will provide a single MCW 644 regardless of the number of references that exist on that object. This facilitates that a single object identity is shared between the MCW 644 and the unmanaged object 640. When the managed client 638 loads the unmanaged object 640, the MCW 644 is created and appears like a managed object to that client. The MCW 644 takes on one of two forms based on how the object was created.

When created as an early bound object (e.g., interfaces determined at compile time), the MCW 644 will be of a specific type and will implement the interfaces 642 the unmanaged object 640 implements. This new managed object may be utilized like other managed types. For example, objects may be caste to any of the interfaces that the object implements and methods can directly be called on those interfaces. Some interfaces on the unmanaged object may not be exposed to the managed class. These interfaces are consumed by the MCW 644 and are factored into a different form as will be described in more detail below.

It noted that the unmanaged environment 620 generally provides that unmanaged components implement certain interfaces such as IUnknown, IProvidedClassInfo, and provides for introspecting type information, through an ITypeInfo interface, for example. The UCW 630 exposes these interfaces via the bridging services 632. This is similar to what the MCW 644 provides for unmanaged components, by exposing Reflection interfaces, for example. Also certain classes of unmanaged components enable ITypeInfo to be extended at runtime by dynamically adding new methods and properties to the ITypeInfo. This can be achieved by exposing another interface ItypeInfoEx and enabling calls to newly added methods and properties through IDispatchEx interface, for example. Similarly, certain managed components enable an associated managed type to be expanded by implementing an IExpand interface, for example, via the bridging services 632.

Figure 11:
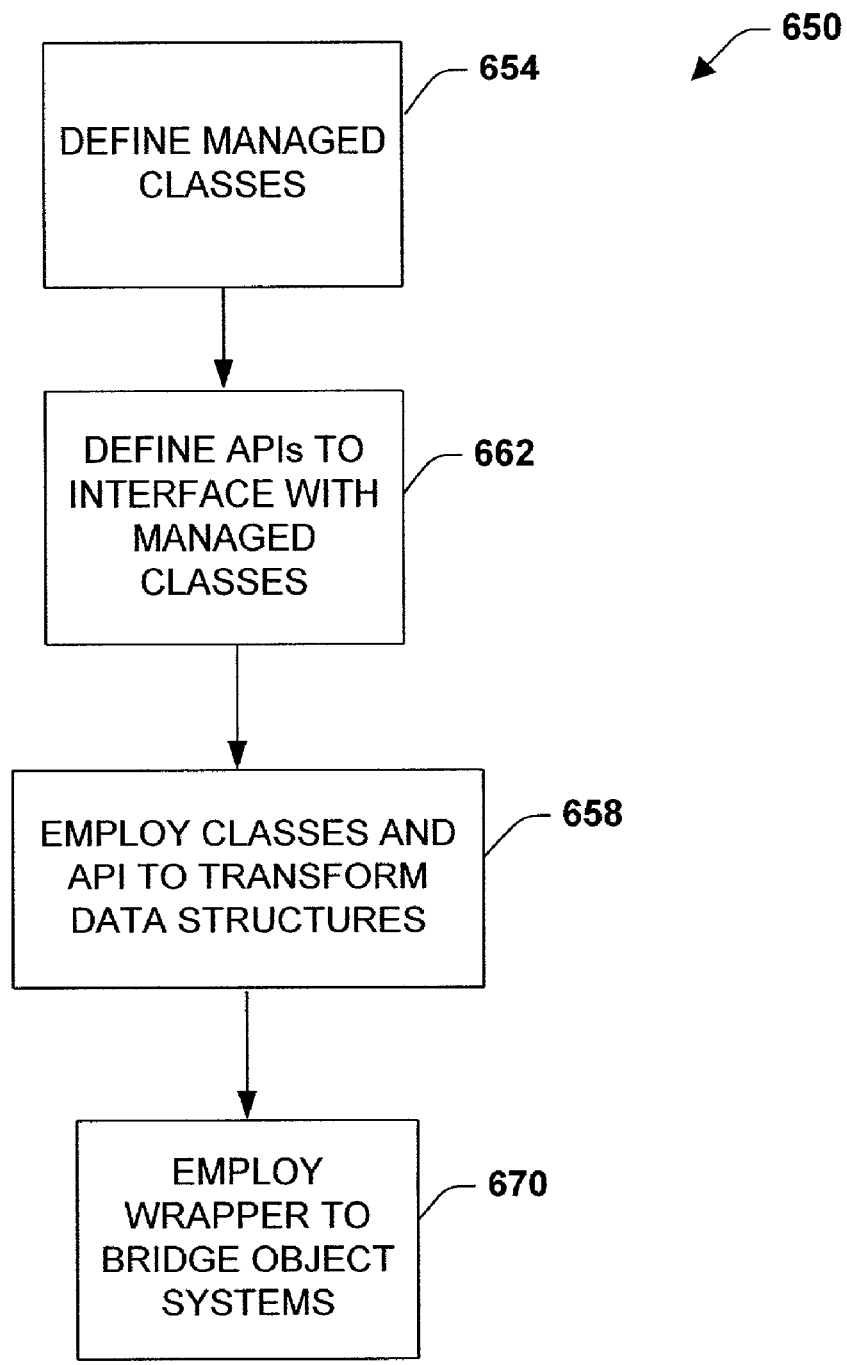
FIG. 11 is a flow diagram illustrating a methodology to manage and communicate data in accordance with an aspect of the present invention.

FIG. 11 illustrates a methodology 650 to facilitate data management and communications in accordance with the present invention. While, for purposes of simplicity of explanation, the methodology may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 654, one or more managed classes are defined to interact with various systems employing various data structures. As noted above, the managed classes can include command classes, adaptor classes, parameter classes and/or bulkload classes, for example. At 662, one or more APIs are provided to interface with the managed classes as described above. At 658, the managed classes and APIs are employed to transform data structures between systems such as during a query, update, fill, and/or bulkload operation between a remote system employing a first data structure and a database employing a second data structure. At 670, one or more wrappers are provided to facilitate interactions between managed and unmanaged object systems that employ the above managed classes and/or APIs.

Figure 12:
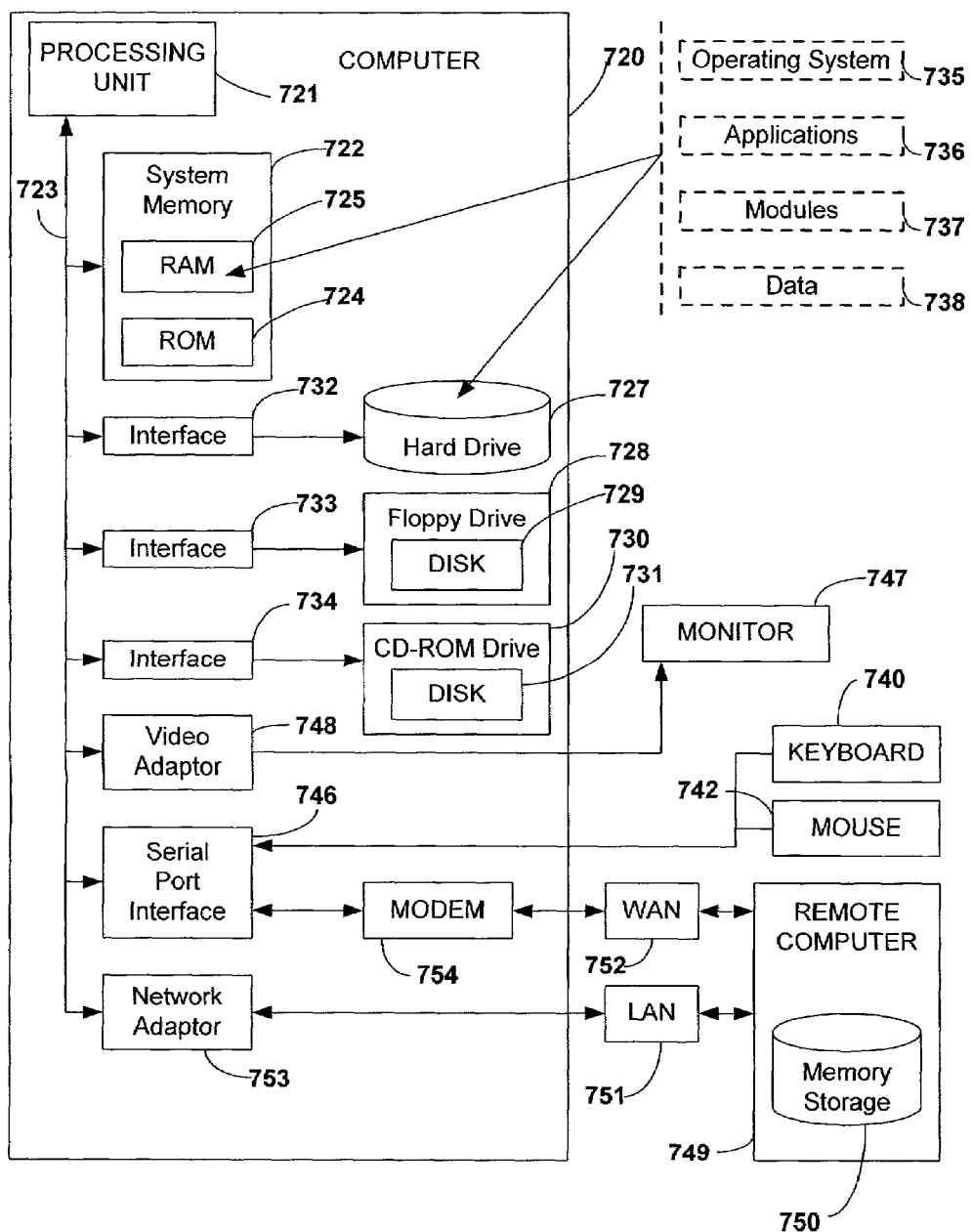
FIG. 12 is a schematic block diagram illustrating a suitable operating environment in accordance with an aspect of the present invention.

In order to provide a context for the various aspects of the invention, FIG. 12 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 12. The logical connections depicted in FIG. 12 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for processing data, comprising:

a managed class to transform data between a first data structure and a second data structure, the data is communicated between a remote system that communicates via the first data structure and a database system that communicates via the second data structure, and the managed class supports at least one of a query, an update, and a change of the data in the database system via the remote system;

a wrapper to facilitate interactions between the managed class and an unmanaged class in accordance with the transformed data;

one or more Application Program Interfaces (APIs) that facilitate interactions between the remote system and the database system, the APIs describe at least one interface type including a command type to facilitate retrieving data from the database system, an adaptor type to facilitate sending changes and updates to the database system, a bulkload type to facilitate bulk updates to the database system, and a parameter type to specify options within the respective interface types; and a diffgram to specify desired updates and changes directed from the remote system to the database system, the diffgram is an XML transmittable file that includes data information from a current data source, data information relating to differences associated with a previous data source and indications of errors associated with the differences in the data sources, the diffgram includes a container that defines boundaries and includes within the boundaries a description of the differences from previous XML transmissions and current database information such that the diffgram enables change-specific portions of a database to be updated without re-transmitting other associated data.

2. The system of claim 1, the first data structure is an XML format, and the second data structure is an SQL format.

3. The system of claim 1, the first and second data structures are adapted with at least one of binary, ascii, hex, HTML, and WML.

4. The system of claim 1, the wrapper is a function that receives calls that are coded in accordance with a managed object platform and provides interface support to facilitate communications with an unmanaged object platform.

5. The system of claim 1, the wrapper employs marshalling processes to bridge communications between the unmanaged and managed classes.

6. The system of claim 1, the managed class operates as an interoperability layer on top of a data base provider to expose unmanaged interfaces to a managed protocol.

7. The system of claim 1, the APIs describe at least one of an SqlXmlCommand, an SqlXmlParameter to specify a value for a parameter in a command class, and an SqlXmlAdapter to populate a data set.

8. The system of claim 7, SqlXmlCommand interfaces with at least one of an ad hoc query, a stored procedure, an XPath query, an Xquery, and an XML template.

9. The system of claim 7, the SqlXmlCommand enables systems to send queries to the database system and retrieve results as at least one of a stream and an XmlReader object.

10. The system of claim 7, the SqlXmlCommand retrieves XML data via an ExecuteStream method, which returns XML data from the database system as a managed code stream instance.

11. The system of claim 7, further comprising an annotated schema is that specifies tables and columns to query in SQL and the structure of a resulting XML format.

12. The system of claim 7, the SqlXmlAdapter is employed to update the database system via at least one of an XML diffgram, an annotated schema, an insert operation, an update operation, a delete operation, and a fill operation.

13. A computer-readable medium having computer-executable instructions stored thereon to perform at least one of transforming the data and providing of claim 1.

14. The system of claim 1, further comprising at least one an HTTP Interface, an SQLXML OLE DB Provider, an SQLXML Managed Class, and a Simple Object Access Protocol to facilitate interactions between the remote system and the database system.

15. A method to facilitate interactions with a database, comprising:
defining a managed class to interact with the database;
defining at least one API to interact with the managed class, the APIs describe at least one interface type including a command type to facilitate retrieving data from the database, an adaptor type to facilitate sending changes to the database, a bulkload type to facilitate bulk updates to the database system, and a parameter type to specify options within the interface types;
wrapping the API to bridge communications between a managed object environment and an unmanaged object environment;
directing at least one of a query, an update, and a change of data to the database system via a remote system; and
generating a diffgram to specify desired updates and changes to the database, the diffgram is an XML transmittable file that includes data information from a current data source, data information relating to differences associated with a previous data source and indications of errors associated with the differences in the data sources.

16. The method of claim 15, further comprising defining a first data structure in an XML format and a second data structure is an SQL format.

17. The method of claim 15, further comprising processing calls that are coded in accordance with a managed object platform and providing interface support to facilitate communications with an unmanaged object platform.

18. The method of claim 15, further comprising marshalling communications between the unmanaged and managed object environments.

19. A system to facilitate data storage and retrieval, comprising:
means for converting data between a first data structure and a second data structure;
means to interface between a managed class and an unmanaged class in accordance with the converted data;
means for defining at least one API to interact with the managed class, the APIs describe at least one interface type including a command type to facilitate retrieving data from a database, an adaptor type to facilitate sending changes to the database, a bulkload type to facilitate bulk updates to the database, and a parameter type to specify options within the interface types;
means for wrapping the API to bridge communications between the managed class and the unmanaged class;
means for directing at least one of a query, an update, and a change of data to the database via a remote system; and
means for generating a diffgram to specify desired updates and changes to the database, the diffgram is an XML transmittable file that includes data information from a current data source, data information relating to differences associated with a previous data source and indications of errors associated with the differences in the data sources.

* * * * *